(12) United States Patent
Ebling et al.

(10) Patent No.: US 10,165,614 B2
(45) Date of Patent: Dec. 25, 2018

(54) PROVIDING ENHANCED AND/OR SUPPLEMENTARY NETWORK CONNECTIVITY TO AT LEAST ONE CLIENT DEVICE THAT IS CONNECTED TO A TELECOMMUNICATIONS NETWORK USING A CUSTOMER PREMISES EQUIPMENT DEVICE

(71) Applicant: Deutsche Telekom AG, Bonn (DE)

(72) Inventors: Holger Ebling, Buettelborn/Worfelden (DE); Norman Freund, Reinheim (DE); Dragan Ilic, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/704,005

(22) Filed: Sep. 14, 2017

(65) Prior Publication Data

US 2018/0084598 A1    Mar. 22, 2018

(30) Foreign Application Priority Data

Sep. 16, 2016   (EP) ..................... 16189269

(51) Int. Cl.

| | |
|---|---|
| *H04W 76/16* | (2018.01) |
| *H04W 40/24* | (2009.01) |
| *H04L 12/28* | (2006.01) |
| *H04W 88/04* | (2009.01) |
| *H04W 88/16* | (2009.01) |
| *H04L 12/413* | (2006.01) |
| *H04L 12/46* | (2006.01) |

(52) U.S. Cl.
CPC ......... *H04W 76/16* (2018.02); *H04L 12/2863* (2013.01); *H04L 12/413* (2013.01); *H04L 12/4625* (2013.01); *H04W 40/24* (2013.01); *H04W 88/04* (2013.01); *H04W 88/16* (2013.01)

(58) Field of Classification Search
CPC ..... H04W 88/04; H04W 88/16; H04W 76/16; H04W 40/24; H04W 72/0493; H04W 76/025; H04W 12/2863; H04W 12/413; H04W 45/24; H04W 47/125
See application file for complete search history.

(56) References Cited

U.S. PATENT DOCUMENTS

| | | | |
|---|---|---|---|
| 2001/0036192 A1* | 11/2001 | Chiles et al. | |
| 2014/0355536 A1* | 12/2014 | Muley et al. | |
| 2015/0288825 A1* | 10/2015 | Cook | |

* cited by examiner

*Primary Examiner* — Mewale A Ambaye
(74) *Attorney, Agent, or Firm* — Leydig, Voit & Mayer, Ltd.

(57) ABSTRACT

A system for providing enhanced and/or supplementary network connectivity to at least one client device being connected to a telecommunications network using a customer premises equipment device includes: the customer premises equipment device; a supplementary access gateway device; and the at least one client device. The supplementary access gateway device is configured to provide enhanced and/or supplementary network connectivity to the at least one client device using the second access network and the first interface of the supplementary access gateway device, the enhanced and/or supplementary network connectivity being provided to the at least one client device instead of or in addition to the network connectivity provided using the first access network and the customer premises equipment device.

9 Claims, 1 Drawing Sheet

PROVIDING ENHANCED AND/OR SUPPLEMENTARY NETWORK CONNECTIVITY TO AT LEAST ONE CLIENT DEVICE THAT IS CONNECTED TO A TELECOMMUNICATIONS NETWORK USING A CUSTOMER PREMISES EQUIPMENT DEVICE

CROSS-REFERENCE TO RELATED APPLICATIONS

Priority is claimed to European Patent Application No. EP 16189269.0, filed on Sep. 16, 2016, the entire disclosure of which is hereby incorporated by reference herein.

FIELD

The present invention relates a supplementary access gateway device for providing enhanced and/or supplementary network connectivity to at least one client device being connected to a telecommunications network using a customer premises equipment device, the customer premises equipment device being able to provide—by using a first interface of the customer premises equipment device towards a first access network of the telecommunications network—network connectivity, using the first access network, between the telecommunications network and the at least one client device.

Furthermore, the present invention relates to a system for providing enhanced and/or supplementary network connectivity to at least one client device being connected to a telecommunications network using a customer premises equipment device, the customer premises equipment device being able to provide—by using a first interface of the customer premises equipment device towards a first access network of the telecommunications network—network connectivity, using the first access network, between the telecommunications network and the at least one client device.

Additionally, the present invention relates to the use of a mobile phone or a mobile computing device, comprising a corresponding software application, as a supplementary access gateway device for providing enhanced and/or supplementary network connectivity to at least one client device being connected to a telecommunications network using a customer premises equipment device, wherein the mobile phone or the mobile computing device is connected to the customer premises equipment device, the customer premises equipment device being able to provide—by using a first interface of the customer premises equipment device towards a first access network of the telecommunications network—network connectivity, using the first access network, between the telecommunications network and the at least one client device.

Still additionally, the present invention relates to a method for providing enhanced and/or supplementary network connectivity to at least one client device being connected to a telecommunications network using a customer premises equipment device, wherein the method comprises connecting a mobile phone or a mobile computing device, being used as a supplementary access gateway device, to the customer premises equipment device, the customer premises equipment device being able to provide—by using a first interface of the customer premises equipment device towards a first access network of the telecommunications network—network connectivity, using the first access network, between the telecommunications network and the at least one client device.

Furthermore, the present invention relates to a program and to a computer program product for providing enhanced and/or supplementary network connectivity to at least one client device that is connected to a telecommunications network using a customer premises equipment device.

The present invention generally relates to the area of providing network access to client devices being connected to a telecommunications network.

BACKGROUND

Typically, client devices use a network connectivity link provided by a customer premises equipment device that connects the client device to a telecommunications network. Such network connectivity to a telecommunications network is typically required in order to provide internet-based services and applications to the client devices to fulfill people's needs in areas such as communication, banking, shopping, information, education and entertainment. Hence, high performance internet access solutions are an important prerequisite. Currently, in most cases, residential customers use digital subscriber line (DSL) technologies (such as asymmetric DSL (ADSL) or very-high-bit-rate DSL (VDSL)) for Internet access, whereas mobile customers use cellular technologies (such as Global System for Mobile Communications (GSM), Universal Mobile Telecommunications Service (UMTS) or Long-Term Evolution (LTE)).

It is also known to use hybrid access connectivity schemes by using hybrid access home gateways, i.e. customer premises equipment devices that are enabled to connect the client device both wirelessly to a wireless access network and using a fixed line connection to a wireline access network. However, typical customer premises equipments (or home gateway devices) are not enabled to provide a hybrid access, and, furthermore, conventionally known hybrid access solutions are typically provided having a dependency between the different possibilities of network connectivity: one possibility of network connectivity—such as the wireless access available within such a solution—typically depends, e.g., on the other possibility of network connectivity—such as the wireline access—especially such that, e.g., both are provided by one and the same service provider (or network operator).

SUMMARY

In an exemplary embodiment, the present invention provides a system for providing enhanced and/or supplementary network connectivity to at least one client device being connected to a telecommunications network using a customer premises equipment device. The system includes: the customer premises equipment device; a supplementary access gateway device; and the at least one client device. The supplementary access gateway device is configured to be connected to the customer premises equipment device. The customer premises equipment device is configured to provide—by using a first interface of the customer premises equipment device towards a first access network of the telecommunications network—network connectivity, using the first access network, between the telecommunications network and the at least one client device. The supplementary access gateway device is configured to be connected directly to a second access network via a first interface of the supplementary access gateway device, wherein the second access network is an access network of either the telecommunications network or of a further telecommunications network. The supplementary access gateway device is configured to provide enhanced and/or supplementary network connectivity to the at least one client device using the second access network and the first interface of the supplementary access gateway device, the enhanced and/or supplementary network connectivity being provided to the at least one client device instead of or in addition to the network connectivity provided using the first access network and the customer premises equipment device. The supplementary access gateway device is configured to be connected to the at least one client device.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide an effective, simple and comparatively cheap solution such that at least one client device is able to be provided with network connectivity (using the access network of at least one telecommunications network or of a plurality of telecommunications networks) in a flexible manner, especially as supplementary network connectivity besides or in addition to using a customer premises equipment device.

The present invention provides a supplementary access gateway device for providing enhanced and/or supplementary network connectivity to at least one client device being connected to a telecommunications network using a customer premises equipment device,
wherein the supplementary access gateway device is provided to be connected to the customer premises equipment device, the customer premises equipment device being able to provide—by using a first interface of the customer premises equipment device towards a first access network of the telecommunications network—network connectivity, using the first access network, between the telecommunications network and the at least one client device,
wherein the supplementary access gateway device is provided to be connected directly to a second access network via a second interface of the supplementary access gateway device,
wherein the second access network is an access network of either the telecommunications network or of a further telecommunications network
wherein the supplementary access gateway device is configured such that enhanced and/or supplementary network connectivity is provided to the at least one client device using the second access network and the second interface of the supplementary access gateway device, this enhanced and/or supplementary network connectivity being provided to the at least one client device instead or besides or in addition to the network connectivity provided using the first access network and the customer premises equipment device, and
the supplementary access gateway device is enabled to be at least logically connected to the at least one client device in order to provide network connectivity using both
    the first access network in addition to the customer premises equipment device, and
    the second access network in addition to the supplementary access gateway device.

It is thereby advantageously possible, according to the present invention, that supplementary access, i.e. internet connectivity, is able to be provided to the client device, i.e. connectivity provided to the client device (or plurality of client devices, e.g. devices located in a home network) instead or besides or in addition to the network connectivity provided using the first access network and the customer premises equipment device, in a flexible manner and independently from the access to the first access network. E.g., it is advantageously possible according to the present invention to provide the supplementary internet connectivity in a nomadic manner, i.e. on-demand and especially independent from the internet services provider, or the operator, of the first access network (i.e. the one typically used by or in connection with the customer premises equipment device). According to an embodiment of the present invention, a mobile phone or a mobile computing device is used as the supplementary access gateway device.

According to the present invention, it is advantageously possible to overcome the drawback of limits fixed network operators often face in providing end customers with broadband transmission capacities (or connectivity), i.e. to provide sufficiently performant internet connectivity (in terms of parameters such as bandwidth and/or latency or the like) in order to meet the end customers' demands. Hence, according to the present invention, a solution is provided so that customers get—continuously or at specific points in time and hence in order to meet peak demand—an increased capacity of internet connectivity available at home in a flexible manner.

Conventionally, the use of hybrid access schemes typically involves the use of hybrid access tariffs (often provided by fixed line operators), and customers use fixed line (internet connectivity) capacity as well as mobile capacity (such as, e.g., LTE capacity) in parallel in order to achieve an overall superior user experience (due to higher data transmission speeds and/or better internet connectivity parameters such as latency or the like) at home. Typically, using such hybrid access schemes involves the necessity to buy and/or rent a specific customer premises equipment being able to handle such hybrid access (or parallel) data streams.

According to the present invention, it is not only possible (for a user or customer of an exemplary embodiment of the inventive supplementary access gateway device and/or of an exemplary embodiment of the inventive system, use or method) to advantageously continue to use the (previously used) customer premises equipment device (especially a customer premises equipment that does not have a hybrid access capability or functionality) and still being able to apply a hybrid access scheme or functionality, but, additionally, it is advantageously possible for that user or customer to use different service providers in connection to using different access networks. Hence, the use of the supplementary access gateway device (and, as a consequence, the use of additional, alternative or cumulative internet connectivity provided by the second access network compared to only using the first access network) is not restricted to customers of the network operator of the first access network (typically providing the fixed line access and/or the mobile access of the customer), but such use of the supplementary access gateway device (and, hence, the second access network) is possible in any third party network. Especially, the solution according to the present invention (i.e. using the supplementary access gateway device) can be provided globally and can be used nomadically, such as from abroad, wherein roaming tariffs are typically also included. According to the present invention, the supplementary access gateway device is preferably realized as a hardware device, but it could also be realized as a software module of another device such as a mobile phone or a mobile computing device.

According to the present invention, it is assumed that a user, using a client device requiring internet connectivity, needs to use an access network (of a telecommunications network) in order to get such internet connectivity (provided by the telecommunications network, via the access network). Examples of such access networks include, but are not limited to, fixed line (or wireline) access networks, typically used to connect digital subscriber line clients or customers such as cable networks or coaxial based networks, or mobile access networks. The fixed line access networks include all kinds of connection type of the last mile, such as electrical, optical, etc. Likewise, the mobile access networks include all kinds of wireless connections, i.e. air interfaces, such as 2G, 3G, 4G, 5G mobile communication networks, connections to local or short range access points wireless local area network (WLAN) or WiFi or Bluetooth access points, as well as combinations of such mobile communication network (air) interfaces and WLAN or WiFi access possibilities. According to the present invention, it is supposed that the customer premises equipment device has—while being used—a first interface towards a first (mobile or fixed line) access network (the first access network being the or an access network of a first telecommunications network), whereby network connectivity is provided between the telecommunications network and the at least one client device. The supplementary access gateway device is provided to be connected to a second access network via a second interface of the supplementary access gateway device. The second access network is either an access network of the (same) telecommunications network or of a (different) further telecommunications network. The supplementary access gateway device is preferably a mobile device (such as a mobile phone or tablet device or the like) having an interface towards the second access network.

In practice, the present invention provides the advantage for a customer or user of the at least one client device to be able to enhance the internet connectivity (e.g. in times of a demand peak or in case of comparatively low internet connectivity performance of the first access network or the like) by using the second access network. This is realized via the supplementary access gateway device being configured such that enhanced and/or supplementary network connectivity is provided to the at least one client device using the second access network and the second interface of the supplementary access gateway device, this enhanced and/or supplementary network connectivity being provided to the at least one client device instead or besides or in addition to the network connectivity provided using the first access network and the customer premises equipment device. According to the present invention, the supplementary access gateway device is enabled to be at least logically connected to the at least one client device in order to provide network connectivity using both the first access network (in addition to (or using) the customer premises equipment device), and the second access network (in addition to (or using) the supplementary access gateway device).

According to the present invention, an exemplary embodiment of the inventive supplementary access gateway device advantageously provides the possibility for the customer (or user of the at least one client device) to continue to use the customer premises equipment device (typically not having the functionality of a hybrid access scheme) while still being able to flexibly use a hybrid access scheme, i.e. using alternatively or simultaneously the first access network as well as the second access network, hence, typically the "old" home gateway of a customer can be used and does not have to be replaced by a new one in order to use a hybrid access scheme. Instead, according to the present invention, via the supplementary access gateway device (also called bandwidth booster device)—typically a device already at the user's disposal—, the customer is able to be provided with additional connectivity functionality compared to the functionality of the previously used home gateway device in order to easily and flexibly use hybrid access connectivity schemes, typically in addition to using the first access network and the customer premises equipment device used to connect client devices.

According to the present invention, the supplementary access gateway device comprises the second interface that is used to connect to the second access network. In this respect, it is preferred according to the present invention that any software (or software components or modules) required for using the mobile phone or mobile computing device as a supplementary access gateway device (to establish the connection to the second access network, i.e. to create a second connection (or internet connectivity) channel) is installed from an installation source or server (e.g., a software program or software modules transmitted to and stored on a hardware device or (hardware) stick, and afterwards transferred on the device used as supplementary access gateway device, or a remote installation source such as a cloud based server).

According to a further embodiment of the present invention—relating to the customer premises equipment device being an integrated device comprising both a modem functionality as well as a router device functionality—, the supplementary access gateway device comprises a third interface, the third interface being provided to connect the supplementary access gateway device to the (integrated) customer premises equipment device in order to provide both the network connectivity—using the first access network and the customer premises equipment device—and the enhanced and/or supplementary network connectivity—using the second access network—to the at least one client device.

Via the connection—via the third interface—between the supplementary access gateway device and the customer premises equipment device, the enhanced and/or supplementary network connectivity is advantageously able to be provided to the at least one client device. The connection between the supplementary access gateway device and the customer premises equipment device can either be realized via a wireline connection, especially a cable connection such as a connection using, e.g., a universal serial bus (USB) cable or a network or local area network (ethernet) cable, or via a wireless connection, especially by using a short range wireless connection, especially either using a WLAN or WiFi connection, between the supplementary access gateway device and the customer premises equipment device, or via a Bluetooth connection or a wireless USB connection.

According to a further alternative embodiment of the present invention, the customer premises equipment device comprises a modem device and a router device as physically separated entities, wherein the supplementary access gateway device comprises a third interface connecting to the modem device, and a sixth interface connecting to the router device of the customer premises equipment device, the third interface and the sixth interface being provided to connect the supplementary access gateway device to the customer premises equipment device (i.e. to the components of the supplementary access gateway device comprising the modem device and the router device as physically separated entities) in order to provide both the network connectivity—using the first access network and the customer premises equipment device—and the enhanced and/or supplementary network connectivity—using the second access network—to the at least one client device.

Via the connection—via the third interface and via the sixth interface—between the supplementary access gateway device and the components of the customer premises equipment device, the enhanced and/or supplementary network connectivity is advantageously able to be provided to the at least one client device. Again, the connection (using the third interface) between the supplementary access gateway device and the modem device of the customer premises equipment device can either be realized via a wireline connection, especially a cable connection such as a connection using, e.g., a universal serial bus (USB) cable or a network or local area network (ethernet) cable, or via a wireless connection, especially by using a short range wireless connection, especially either using a WLAN or WiFi connection, between the supplementary access gateway device and the customer premises equipment device, or via a Bluetooth connection or a wireless USB connection. Likewise, the connection (using the sixth interface) between the supplementary access gateway device and the router device of the customer premises equipment device can either be realized via a wireline connection, especially a cable connection such as a connection using, e.g., a universal serial bus (USB) cable or a network or local area network (ethernet) cable, or via a wireless connection, especially by using a short range wireless connection, especially either using a WLAN or WiFi connection, between the supplementary access gateway device and the customer premises equipment device, or via a Bluetooth connection or a wireless USB connection.

According to a further embodiment of the present invention, the supplementary access gateway device comprises a fourth interface and is enabled to provide the enhanced and/or supplementary network connectivity to the at least one client device using the fourth interface while the at least one client device is physically or wirelessly connected to the supplementary access gateway device.

By using the fourth interface, it is advantageously possible to provide the enhanced and/or supplementary network connectivity to the at least one client device while it is directly connected to the supplementary access gateway device. Typically in a home or small business network environment, a plurality of client (computer) devices—such as handheld or portable or desktop computers, (music or video) streaming devices, television devices, or other multimedia devices—are classically connected to the customer premises equipment device. By using the supplementary access gateway device according to the present invention, enhanced and/or supplementary network connectivity is able to be provided to these client devices, using the second access network. According to one embodiment of the present invention, the supplementary access gateway device is directly connected to the client devices using the fourth interface. The fourth interface between the supplementary access gateway device and the client devices (or at least one client device) can either be realized via a wireline connection, especially a cable connection such as a connection using, e.g., a universal serial bus (USB) cable or a network or local area network (ethernet) cable, or via a wireless connection, especially by using a short range wireless connection, especially either using a WLAN or WiFi connection, between the supplementary access gateway device and the customer premises equipment device, or via a Bluetooth connection or a wireless USB connection. The direct connection between the supplementary access gateway device and the client devices using the fourth interface typically means—especially in case of a WLAN or WiFi connection via which the fourth interface is realized—that the supplementary access gateway device acts as a WLAN or WiFi access point with regard to the client devices.

According to still a further embodiment of the present invention, the supplementary access gateway device is enabled to provide the enhanced and/or supplementary network connectivity to the at least one client device while the at least one client device is physically or wirelessly connected to a fifth interface of the customer premises equipment device, and at least logically connected to the supplementary access gateway device.

By using the fifth interface (between the client devices, on the one hand, and the customer premises equipment device, on the other hand) and an at least logical connection between the supplementary access gateway device and the client devices (via the customer premises equipment device and typically using the third and/or sixth interface), it is advantageously possible to provide the enhanced and/or supplementary network connectivity to the at least one client device while it remains directly connected to the customer premises equipment device as it is typically the case in a home or small business network environment. Via the at least logical connection between the supplementary access gateway device and the client devices (using an indirect physical (wireless or wireline) connection via the customer premises equipment device and typically using the third and/or sixth interface(s)), enhanced and/or supplementary network connectivity is able to be provided to these client devices, using the second access network (instead or besides or in addition to the network connectivity provided using the first access network). According to this embodiment of the present invention, the supplementary access gateway device is indirectly (at least logically) connected to the client devices using the fifth (as well as third and/or sixth) interfaces. The fifth interface between the customer premises equipment device and the client devices (or at least one client device) can either be realized via a wireline connection, especially a cable connection such as a connection using, e.g., a universal serial bus (USB) cable or a network or local area network (ethernet) cable, or via a wireless connection, especially by using a short range wireless connection, especially either using a WLAN or WiFi connection, between the supplementary access gateway device and the customer premises equipment device, or via a Bluetooth connection or a wireless USB connection. The indirect (physical) connection between the supplementary access gateway device and the client devices using the fifth as well as third and/or sixth interfaces typically means—especially in case of a WLAN or WiFi connection via which the fifth interface is realized—that the customer premises equipment device acts as a WLAN or WiFi access point with regard to the client devices.

According to a further embodiment of the present invention, the supplementary access gateway device is a mobile phone or mobile computing device comprising a software application such that the supplementary access gateway device connects, using the third interface, to the customer premises equipment device, and additionally, connects, using the second interface, to the second access network in order to provide enhanced and/or supplementary network connectivity to the at least one client device using the second access network Via the second interface, it is advantageously possible according to the present invention that the supplementary access gateway device is easily connected to the second access network. In case that the mobile phone or mobile computing device provides the functionality of using a further second interface (towards the third access network), or that a further mobile phone or a further mobile computing device is used with the customer premises equipment device as a further (or additional) supplementary access gateway device, it is advantageously possible that enhanced and/or supplementary network connectivity is able to be provided to the at least one client device in addition to using the first access network and the second access network (namely by additionally or alternatively using the third access network).

According to still a further embodiment of the present invention, the supplementary access gateway device is able to be charged (either by the customer premises equipment device or by the electricity grid), especially via the third interface being a wireline interface, or via a wireless charging interface.

Thereby, it is advantageously possible according to the present invention that the supplementary access gateway device is charged while being used for providing the enhanced and/or supplementary network connectivity to the client devices.

Furthermore, the present invention relates to a system for providing enhanced and/or supplementary network connectivity to at least one client device being connected to a telecommunications network using a customer premises equipment device, wherein the system comprises the customer premises equipment device, a supplementary access gateway device, and the at least one client device, wherein the supplementary access gateway device is provided to be connected to the customer premises equipment device, the customer premises equipment device being able to provide—by using a first interface of the customer premises equipment device towards a first access network of the telecommunications network—network connectivity, using the first access network, between the telecommunications network and the at least one client device, wherein the supplementary access gateway device is provided to be connected directly to a second access network via a second interface of the supplementary access gateway device, wherein the second access network is an access network of either the telecommunications network or of a further telecommunications network, wherein the system is configured such that enhanced and/or supplementary network connectivity is provided to the at least one client device using the second access network and the second interface of the supplementary access gateway device, this enhanced and/or supplementary network connectivity being provided to the at least one client device instead or besides or in addition to the network connectivity provided using the first access network and the customer premises equipment device, and the supplementary access gateway device is enabled to be at least logically connected to the at least one client device in order to provide network connectivity using both the first access network in addition to the customer premises equipment device, and the second access network in addition to the supplementary access gateway device.

Thereby, it is advantageously possible to provide a system that is capable of providing supplementary access, i.e. internet connectivity, to a client device that is typically used in connection with a customer premises equipment device, e.g. in a home or small business network.

The present invention furthermore also relates to use of a mobile phone or a mobile computing device, comprising a corresponding software application, as a supplementary access gateway device for providing enhanced and/or supplementary network connectivity to at least one client device being connected to a telecommunications network using a customer premises equipment device, wherein the mobile phone or the mobile computing device is connected to the customer premises equipment device, the customer premises equipment device being able to provide—by using a first interface of the customer premises equipment device towards a first access network of the telecommunications network—network connectivity, using the first access network, between the telecommunications network and the at least one client device, wherein the mobile phone or the mobile computing device is connected directly to a second access network via and a second interface of the mobile phone or the mobile computing device, wherein the second access network is an access network of either the telecommunications network or of a further telecommunications network, wherein the mobile phone or the mobile computing device is used such that enhanced and/or supplementary network connectivity is provided to the at least one client device using the second access network and the second interface of the supplementary access gateway device, this enhanced and/or supplementary network connectivity being provided to the at least one client device instead or besides or in addition to the network connectivity provided using the first access network and the customer premises equipment device, and the mobile phone or the mobile computing device is at least logically connected to the at least one client device in order to provide network connectivity using both the first access network in addition to the customer premises equipment device, and the second access network in addition to the supplementary access gateway device.

Thereby, it is advantageously possible to use a supplementary access gateway devices such as to provide supplementary access, i.e. internet connectivity, to a client device that is typically used in connection with a customer premises equipment device.

According to the present invention it is furthermore preferred—especially with respect to an exemplary embodiment of the inventive system and/or use of a mobile phone or a mobile computing device—that the mobile phone or the mobile computing device is connected to the second access network and the second access network being an access network of a further telecommunications network compared to the first access network and the telecommunications network, and wherein especially the telecommunications network and the further telecommunications network have different operators.

The present invention furthermore also relates to a method for providing enhanced and/or supplementary network connectivity to at least one client device being connected to a telecommunications network using a customer premises equipment device,
wherein the method comprises connecting a mobile phone or a mobile computing device, being used as a supplementary access gateway device, to the customer premises equipment device, the customer premises equipment device being able to provide—by using a first interface of the customer premises equipment device towards a first access network of the telecommunications network—network connectivity, using the first access network, between the telecommunications network and the at least one client device,
wherein the mobile phone or the mobile computing device is directly connected to a second access network via a second interface of the mobile phone or the mobile computing device,
wherein the second access network is an access network of either the telecommunications network or of a further telecommunications network,
wherein the method comprises the steps of:
  providing enhanced and/or supplementary network connectivity to the at least one client device using the second access network and the second interface of the mobile phone or the mobile computing device, this enhanced and/or supplementary network connectivity being provided to the at least one client device instead or besides or in addition to the network connectivity provided using the first access network and the customer premises equipment device, and
  connecting the mobile phone or the mobile computing device to the at least one client device in order to provide network connectivity using both
    the first access network in addition to the customer premises equipment device, and
    the second access network in addition to the mobile phone or the mobile computing device.

Thereby, it is advantageously possible to provide supplementary access, i.e. internet connectivity, to a client device that is typically used in connection with a customer premises equipment device.

According to the present invention it is furthermore preferred—especially with respect to an exemplary embodiment of the inventive method—that the method comprises the step of charging the supplementary access gateway device, especially using the third interface of the supplementary access gateway device.

According to the present invention it is furthermore preferred—especially with respect to an exemplary embodiment of the inventive method—that the method comprises the step of using the mobile phone or the mobile computing device (as a supplementary access gateway device) to establish—between the at least one client device on the one hand, and a server entity on the other hand—both a first communication path using the first access network and a second communication path using the second access network.

Additionally, the present invention relates to a program comprising a computer readable program code which, when executed on a computer or on a supplementary access gateway device or on a customer premises equipment device, or in part on the supplementary access gateway device and/or in part on the customer premises equipment device, causes the computer or the supplementary access gateway device or the customer premises equipment device to perform an exemplary embodiment of the inventive method.

Still additionally, the present invention relates to a computer program product for providing enhanced and/or supplementary network connectivity to at least one client device that is connected to a telecommunications network using a customer premises equipment device, the computer program product comprising a computer program stored on a storage medium, the computer program comprising program code which, when executed on a computer or on a supplementary access gateway device or on a customer premises equipment device, or in part on the supplementary access gateway device and/or in part on the customer premises equipment device, causes the computer or the supplementary access gateway device or the customer premises equipment device to perform an exemplary embodiment of the inventive method.

According to an alternative embodiment of the present invention, the storage medium is a cloud based server or cloud based storage depositary which stores, at least in part, an exemplary embodiment of the inventive computer program product for providing enhanced and/or supplementary network connectivity to at least one client device that is connected to a telecommunications network using a customer premises equipment device.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
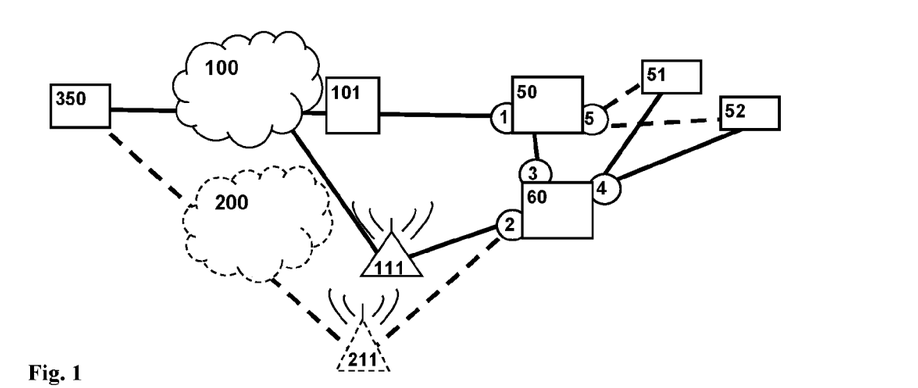
FIG. 1 schematically illustrates a system according to the present invention, comprising a telecommunications network, a plurality of client devices, a customer premises equipment device, and a supplementary access gateway device according to the present invention.

In FIG. 1, a telecommunications network 100 with an exemplary embodiment of an inventive system is schematically shown, the system comprising a plurality of client devices 51, 52, a customer premises equipment device 50, and a supplementary access gateway device 60. The telecommunications network 100 comprises an access network 101 that connects the telecommunications network 100, via the customer premises equipment 50 to the client devices 51, 52. Due to the fact that the functionality of the access network 101 of providing internet or network connectivity to the client devices 51, 52 shall be enhanced or supplemented according to the present invention, using a different access network, the access network 101 is hereinafter also called first access network 101. The network connectivity provided to the client devices 51, 52 carries, e.g., the communication services of a specific server 350 that is either part of the telecommunications network 100 or external to the telecommunications network 100.

FIG. 1 specifically shows a first embodiment or a first group of alternative embodiments according to the present invention, according to which the customer premises equipment device 50 is an integrated device comprising both a modem functionality as well as a router device functionality. A number of client devices 51, 52 are connected to the telecommunications network 100. As an exemplary embodiment, just two client devices, a first client device 51, and a second client device 52 are schematically shown as an example of client devices requiring internet connectivity typically provided by the telecommunications network 100 using a first interface 1 of the customer premises equipment device 50. In order to provide the client devices 51, 52 with enhanced and/or supplementary network connectivity (instead of or in addition to the network connectivity provided by the telecommunications network 100 using the first access network 101), the present invention provides a supplementary access gateway device 60. The supplementary access gateway device 60 comprises a second interface 2 in order to connect to a second access network 111, 211 to be used in addition to the first access network 101. In the context of the first embodiment or the first group of alternative embodiments, the supplementary access gateway device 60 has a third interface 3 towards the customer premises equipment device 50.

Figure 2:
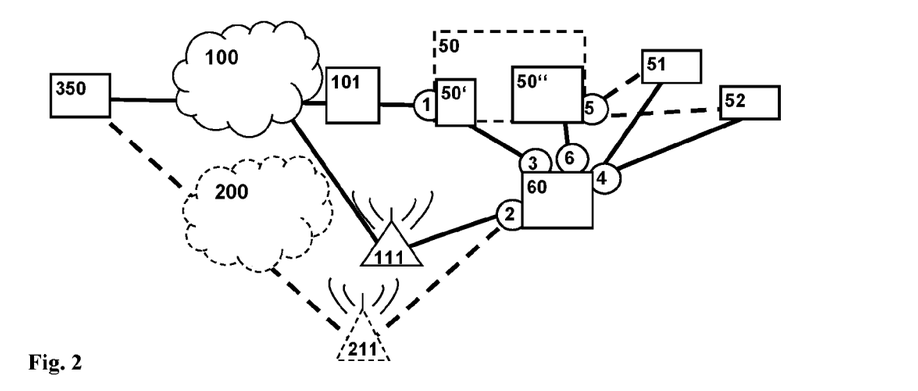
FIG. 2 schematically illustrates a system according to the present invention, comprising a telecommunications network, a plurality of client devices, a customer premises equipment device comprising a modem device and a router device, and a supplementary access gateway device according to the present invention.

FIG. 2 schematically shows a second embodiment or a second group of alternative embodiments according to the present invention, according to which the customer premises equipment device 50 is not provided as an integrated device but comprises a modem device 50' and a router device 50" as physically separated entities, wherein together, the modem device 50' and the router device 50" (despite being provided as physically separated entities) provide the customer premises equipment device 50 (schematically represented by means of a dashed line in FIG. 2). Likewise in FIG. 2, a number of client devices 51, 52 are connected to the telecommunications network 100. Again as an exemplary embodiment, just two client devices, the first client device 51, and the second client device 52 are schematically shown as an example of client devices requiring internet connectivity typically provided by the telecommunications network 100 using the first interface 1 of the customer premises equipment device 50. Again, the supplementary access gateway device 60 is used to provide the client devices 51, 52 with enhanced and/or supplementary network connectivity. Therefore, the supplementary access gateway device 60 comprises the second interface 2 in order to be connected to a second access network 111, 211 to be used in addition to the first access network 101. In the context of the second embodiment or the second group of alternative embodiments, the supplementary access gateway device 60 has a third interface 3 towards the modem device 50' of the customer premises equipment device 50, and a sixth interface 6 towards the router device 50" of the customer premises equipment device 50.

According to both the first and the second embodiment or groups of alternative embodiments of the present invention, the client devices 51, 52 are at least logically connected to the supplementary access gateway device 60. According to one alternative (of both the first and the second groups of alternative embodiments of the present invention), the client devices 51, 52 are directly (especially physically) connected to the supplementary access gateway device 60, by using a fourth interface 4 (this alternative embodiment being illustrated, both in FIG. 1 and in FIG. 2, by means of a drawn-through line between the first and second client devices 51, 52 and the fourth interface 4). The fourth interface 4 is typically either realized as a wireline or cable interface, or alternatively a wireless interface. According to this alternative, the client devices 51, 52 might also be indirectly connected—but at least logically connected—to the customer premises equipment device 50 (typically using the third interface 3 (between the supplementary access gateway device 60 and the customer premises equipment device 50) or using the third interface 3 and/or the sixth interface 6 (between the supplementary access gateway device 60 and the modem device 50', or the router device 50" of the customer premises equipment device 50, respectively). According to another alternative (of both the first and the second groups of alternative embodiments of the present invention), the client devices 51, 52 are directly (physically) connected to the customer premises equipment device 50 (typically to the router device 50" part of the customer premises equipment device 50 in case of the customer premises equipment device 50 not being provided as an integrated device), by using a fifth interface 5 (this alternative embodiment being illustrated, both in FIG. 1 and in FIG. 2, by means of a dashed line between the first and second client devices 51, 52 and the fifth interface 5), but are nevertheless at least logically connected to the supplementary access gateway device 60.

Again, according to both the first and the second embodiment or groups of alternative embodiments of the present invention, the client devices 51, 52 are provided with enhanced and/or supplementary network connectivity (instead of or in addition to the network connectivity provided by the telecommunications network 100 using the first access network 101), using the second interface 2 of the supplementary access gateway device 60, and the second access network 111, 211. In this respect, exemplary embodiments of the present invention provide at least two alternative possibilities (that could also be cumulatively realized): According to a first embodiment, the supplementary access gateway device 60 connects to a first kind of the second access network 111, such a first kind of the second access network 111 belonging to the (first) telecommunications network 100 (i.e. both the first access network 101, and the (first kind of the) second access network 111 are part of the same (first) telecommunications network 100) (and this first telecommunications network often having a common network operator for both the first access network 101 and the second access network 111); according to a second embodiment, the supplementary access gateway device 60 connects to a second kind of the second access network 211 (represented using a dashed line in both FIGS. 1 and 2), such a second kind of the second access network 211 belonging to a second telecommunications network 200 (represented using a dashed line in both FIGS. 1 and 2).

According to the present invention, the connection towards the second access network 111, 211 (e.g. a mobile connection towards a mobile communication network) is established via the second interface 2 of the supplementary access gateway device 60 (or a further supplementary access gateway device, or more than two supplementary access gateway devices). The supplementary access gateway device 60 is preferably a mobile device of the end customer (such as a smart phone or a tablet or a stick) providing, e.g., an LTE connection. The customer easily connects its mobile device to the customer premises equipment 50 via USB, WiFi or other channels for data transport. If the mobile device (or supplementary access gateway device 60) is connected to the customer premises equipment device 50 via USB or another cable connection, the battery of the mobile device (i.e. the supplementary access gateway device 60) can be charged.

The supplementary access gateway device 60 establishes one or more connections for broadband (data) services, mobile and fixed line or hotspot connection. The supplementary access gateway device 60 comprises software (especially as downloaded software, e.g. in form of an app (lication)) such that it is capable to manage and bundle all connections simultaneously. It depends on the use case to steer certain traffic via a dedicated connection. However, even though the use of a hybrid access scheme is preferred according to the present invention, it is also possible to operate and use the supplementary access gateway device 60 by merely using only one connection (i.e. using only one of the plurality of access networks 101, 111, 211).

In case that a fixed line connection (such as a digital subscriber line) shall be enhanced, the supplementary access gateway device 60 is connected to the existing home gateway (i.e. the customer premises equipment device 50), either via an Ethernet cable, WiFi connection, or the like. The supplementary access gateway device 60 is connected to the domestic home gateway (or the customer premises equipment device 50) that establishes the fixed line connection to the internet via xDSL, fibre, cable etc. The interfaces possible to be used with regard to the present invention include (but are not limited to) USB xxx, WiFi, Ethernet, LiFi, Bluetooth, Powerline, Power over Ethernet.

The solution is not restricted to the number of connected devices/home routers and is only limited by the number of physical interfaces available at the supplementary access gateway device 60. Different types of OS (such as iOS, Android) are supported and can be combined; the same holds for different mobile access technologies such as 3G, LTE, 5G, etc.

If the supplementary access gateway device 60 (i.e. a user equipment such as a smart phone, a laptop, etc.) needs additional software to connect properly or adequately, it will be provided especially through the corresponding app stores.

The solution according to the present invention provides a customer interface that allows for prioritising the established connections in multiple dimensions, such as, e.g., (a) among the used access technologies (LTE, DSL etc.) and (b) among the network operator providing the access technologies. Additionally, it is preferred to use tunneling protocols in order to also enhance the security level and/or an encryption.

The service authentication can be done over all available IP based access types. An authentication at a bandwidth booster network server is typically used to enables the service to the end customer.

The multiple connections run over the mobile and fixed line network and are combined at the bandwidth booster network server such as server 350, represented in FIGS. 1 and 2.

The first connection that is established over any available IP based access type (mobile, fixed etc.) initiates the service and traffic transmission starts. The following connections are added to it and packets are bundled.

The bundling of established connections for one dedicated customer is done via unique identifier indicated via header enrichment in the transmitted packets or based on certificates. The approach is also capable of enhancing the security of traffic transmission because the packets are distributed over multiple independent connections/branches. Each connection carries only parts of the complete transmitted packets.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for providing enhanced and/or supplementary network connectivity to at least one client device being connected to a telecommunications network using a customer premises equipment device,
    wherein the system comprises: the customer premises equipment device; a mobile phone or a mobile computing device being used as a supplementary access gateway device; and the at least one client device;
    wherein the supplementary access gateway device is configured to be connected to the customer premises equipment device;
    wherein the customer premises equipment device is configured to provide—by using a first interface of the customer premises equipment device towards a first access network of the telecommunications network—network connectivity, using the first access network, between the telecommunications network and the at least one client device;
    wherein the supplementary access gateway device is configured to be connected directly to a second access network via a first interface of the supplementary access gateway device, wherein the second access network is an access network of either the telecommunications network or of a further telecommunications network;
    wherein the supplementary access gateway device is configured to provide enhanced and/or supplementary network connectivity to the at least one client device using the second access network and the first interface of the supplementary access gateway device, the enhanced and/or supplementary network connectivity being provided to the at least one client device instead of or in addition to the network connectivity provided using the first access network and the customer premises equipment device; and wherein the supplementary access gateway device is configured to be connected to the at least one client device via a logical connection.

2. A supplementary access gateway device for providing enhanced and/or supplementary network connectivity to at least one client device being connected to a telecommunications network using a customer premises equipment device, the supplementary access gateway device comprising:

a first interface, configured to connect the supplementary access gateway device to the customer premises equipment device, the customer premises equipment device being configured to provide—by using a first interface of the customer premises equipment device towards a first access network of the telecommunications network—network connectivity, using the first access network, between the telecommunications network and the at least one client device;

a second interface, configured to connect the supplementary access gateway device directly to a second access network, wherein the second access network is an access network of either the telecommunications network or of a further telecommunications network; and a third interface, configured to connect the supplementary access gateway device to the at least one client device via a logical connection and to provide enhanced and/or supplementary network connectivity to the at least one client device using the second access network, the enhanced and/or supplementary network connectivity being provided to the at least one client device instead of or in addition to the network connectivity provided using the first access network and the customer premises equipment device;

wherein the supplementary access gateway device is a mobile phone or a mobile computing device.

3. The supplementary access gateway device according to claim 2, wherein the customer premises equipment device comprises a modem device and a router device as physically separate entities, and wherein the supplementary access gateway device comprises separate interfaces for connecting the supplementary access gateway device to the modem device and to the router device of the customer premises equipment device.

4. The supplementary access gateway device according to claim 2, wherein the third interface is configured to provide the enhanced and/or supplementary network connectivity to the at least one client device while the at least one client device is physically or wirelessly connected the customer premises equipment device and connected to the supplementary access gateway device.

5. The supplementary access gateway device according to claim 2, wherein the connection provided by the third interface is a logical connection.

6. The supplementary access gateway device according to claim 2, wherein the supplementary access gateway device is a mobile phone or a mobile computing device comprising a software application.

7. A method for providing enhanced and/or supplementary network connectivity to at least one client device being connected to a telecommunications network using a customer premises equipment device, wherein the method comprises:

connecting a mobile phone or a mobile computing device, being used as a supplementary access gateway device, to the customer premises equipment device, the customer premises equipment device being configured to provide—by using a first interface of the customer premises equipment device towards a first access network of the telecommunications network—network connectivity, using the first access network, between the telecommunications network and the at least one client device;

wherein the mobile phone or the mobile computing device is directly connected to a second access network via a second interface of the mobile phone or the mobile computing device, wherein the second access network is an access network of either the telecommunications network or of a further telecommunications network;

wherein the method further comprises:

providing enhanced and/or supplementary network connectivity to the at least one client device using the second access network and the second interface of the mobile phone or the mobile computing device, the enhanced and/or supplementary network connectivity being provided to the at least one client device instead of or in addition to the network connectivity provided using the first access network and the customer premises equipment device; and connecting the mobile phone or the mobile computing device to the at least one client device via a logical connection.

8. The method according to claim 7, wherein the method further comprises:

using the mobile phone or the mobile computing device to establish—between the at least one client device on the one hand, and a server entity on the other hand—both a first communication path using the first access network and a second communication path using the second access network.

9. One or more non-transitory computer-readable mediums having processor-executable instructions stored thereon for providing enhanced and/or supplementary network connectivity to at least one client device being connected to a telecommunications network using a customer premises equipment device, wherein the processor-executable instructions, when executed, facilitate performance of the following:

connecting a mobile phone or a mobile computing device, being used as a supplementary access gateway device, to the customer premises equipment device, the customer premises equipment device being configured to provide—by using a first interface of the customer premises equipment device towards a first access network of the telecommunications network—network connectivity, using the first access network, between the telecommunications network and the at least one client device;

wherein the mobile phone or the mobile computing device is directly connected to a second access network via a second interface of the mobile phone or the mobile computing device, wherein the second access network is an access network of either the telecommunications network or of a further telecommunications network;

wherein the processor-executable instructions, when executed, further facilitate performance of the following:

providing enhanced and/or supplementary network connectivity to the at least one client device using the second access network and the second interface of the mobile phone or the mobile computing device, the enhanced and/or supplementary network connectivity being provided to the at least one client device instead of or in addition to the network connectivity provided using the first access network and the customer premises equipment device; and connecting the mobile phone or the mobile computing device to the at least one client device via a logical connection.

* * * * *